(12) United States Patent
Zhang

(10) Patent No.: US 8,693,322 B2
(45) Date of Patent: Apr. 8, 2014

(54) ROUTING METHOD FOR A WIRELESS MULTI-HOP NETWORK

(76) Inventor: Yikun Zhang, Beijing (CN)

(*) Notice: Subject to any disclaimer, the term of this patent is extended or adjusted under 35 U.S.C. 154(b) by 92 days.

(21) Appl. No.: 13/400,802

(22) Filed: Feb. 21, 2012

(65) Prior Publication Data

US 2013/0215739 A1    Aug. 22, 2013

(51) Int. Cl.
| | |
|---|---|
| H04L 1/00 | (2006.01) |
| H04L 12/26 | (2006.01) |
| H04J 1/16 | (2006.01) |
| H04J 3/14 | (2006.01) |
| H04W 28/02 | (2009.01) |
| H04W 28/00 | (2009.01) |
| H04W 28/08 | (2009.01) |

(52) U.S. Cl.
CPC ............ *H04W 28/021* (2013.01); *H04W 28/02* (2013.01); *H04W 28/00* (2013.01); *H04W 28/08* (2013.01); *H04W 28/0289* (2013.01)
USPC ............ 370/229; 370/230; 370/231; 370/232

(58) Field of Classification Search
CPC ... H04W 28/021; H04W 28/02; H04W 28/00; H04W 28/08; H04W 28/0289
USPC ................. 370/229, 230, 231, 232, 235, 236; 709/231, 238, 239, 240
See application file for complete search history.

(56) References Cited

FOREIGN PATENT DOCUMENTS

| | | |
|---|---|---|
| CN | 101179501 A | 5/2008 |
| CN | 101335701 A | 12/2008 |

OTHER PUBLICATIONS

Yikun Zhang, Timothy X Brown, "Aisle Routing for Mobile Ad Hoc Networks", IEEE Wireless Communications and Network Conference (WCNC'08), Mar. 2008.*
Yikun Zhang, Timothy X Brown, "Aisle Routing for Mobile Ad Hoc Networks", IEEE Wireless Communications and Networking COnference (WCN'08), Mar. 2008.*
C. Perkings et al., "Ad Hoc On-Demand Distance Vector (AODC) Routing—RFC 3561", Jul. 2003, Internet Engineering Task Force, all pages.*
D. Johnson et al., "The Dynamic Source Routing Portocol (DSR) for Mobile Ad Hoc Networks for IPv4—RFC 4728", Feb. 2007, Internet Engineering Task Force, all pages.*

* cited by examiner

*Primary Examiner* — Kwang B Yao
*Assistant Examiner* — Adam Duda

(57) ABSTRACT

Disclosed is a routing method named lock routing for a wireless multi-hop network, which can be based on next-hop routing and source routing and named next-hop lock routing and source lock routing respectively. The routing method utilizes traffic packets to monitor the link quality and utilizes local broadcast to help a source node keep track of the varying network topology in order to update a route path to a destination node. In local broadcast, routing control messages can be forwarded by path nodes and neighbors of an old route path, which reduces the routing control overhead and enhances the network scalability. A route update process can be triggered by the link quality and the path node state and is used to maintain ongoing traffic flows and extend the network lifetime.

10 Claims, 4 Drawing Sheets

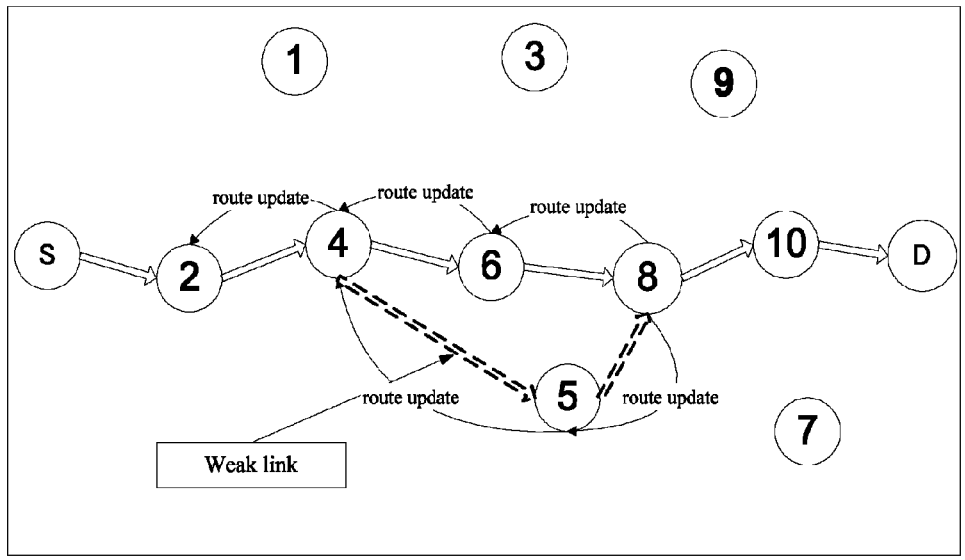
FIG. 1
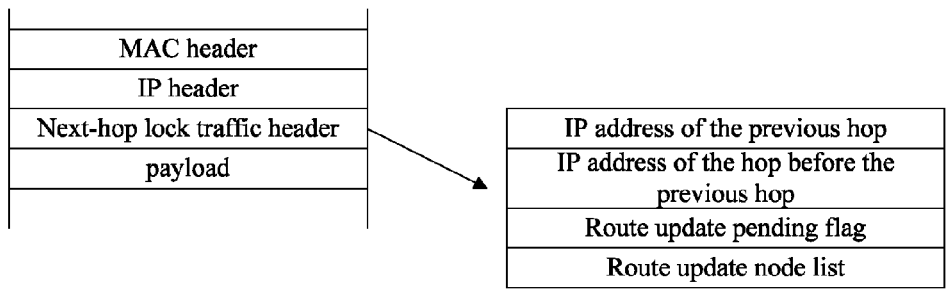
FIG. 2
| Initiator IP address |
| Target IP address |
| Destination IP address |
| Route update ID |
| Route update reason |
| Route update node list |
| New route node list |
| Minimum link quality |
| Hop count between initiator and destination |
FIG. 3

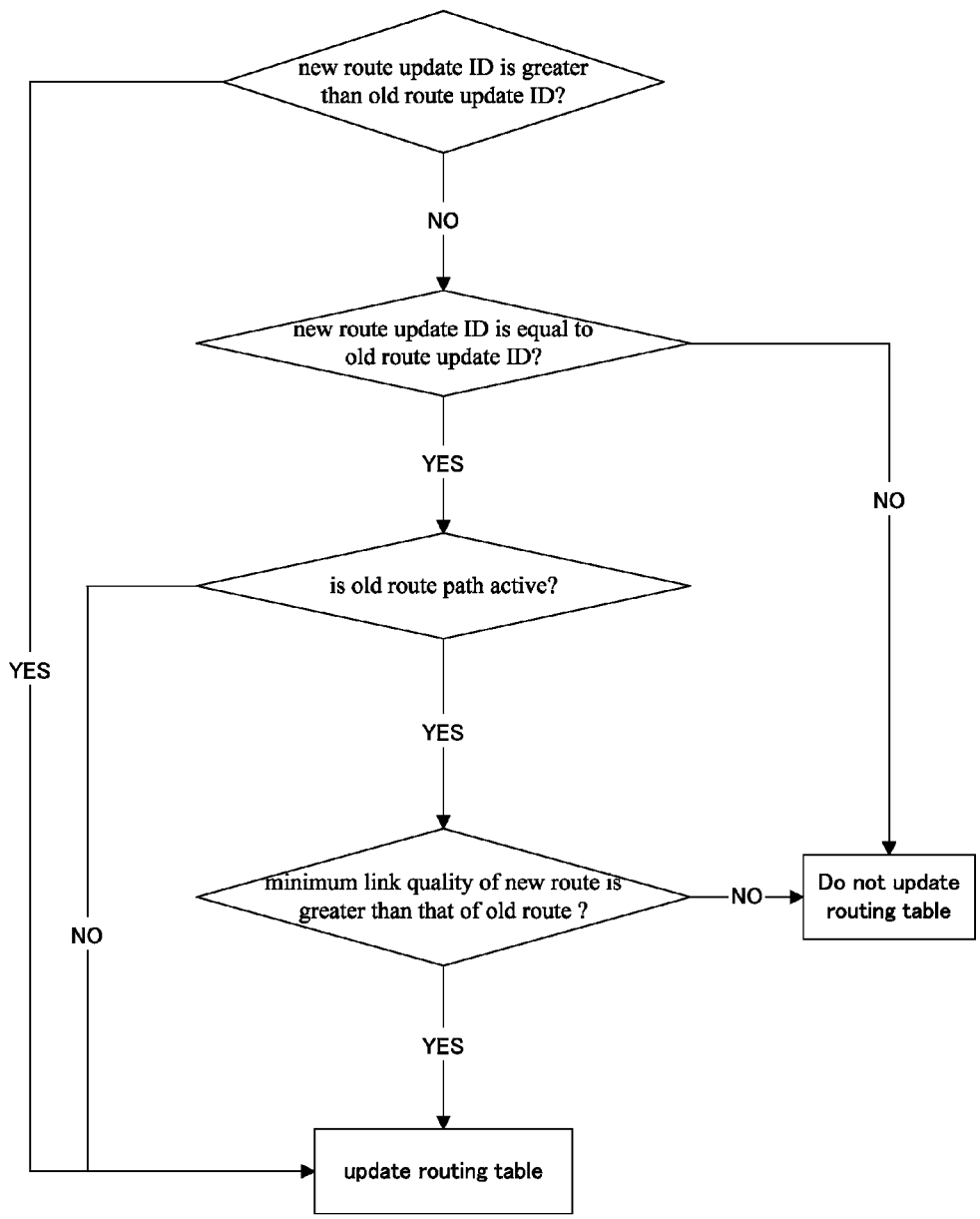

| MAC header |
| IP header |
| Source lock traffic header |
| payload |

Route update flag

| Route update ID |
| Route update reason |
| Source IP address |
| Destination IP address |
| New route node list |
| Minimum link quality |
| Average link quality |

ROUTING METHOD FOR A WIRELESS MULTI-HOP NETWORK

CROSS-REFERENCE TO RELATED APPLICATIONS

This application is based on and hereby claims priority to Chinese Application No. 201110057016.2 filed on Mar. 10, 2011, the contents of which are hereby incorporated by reference.

FIELD OF THE INVENTION

This invention named lock routing relates to a routing method used in wireless multi-hop network that includes mobile ad hoc network (MANET), wireless mesh network, and wireless sensor network.

BACKGROUND OF THE INVENTION

A wireless multi-hop network consists of mobile or static nodes. These nodes function as routers or hosts or both of them. These nodes depend on wireless links between them for communication. Communication between a source node and a destination node can be through direct links if they are neighbors, or through intermediate nodes' relay. Wireless multi-hop networks include MANET, wireless mesh network, and wireless sensor network.

The characteristics of a wireless multi-hop network are: 1) communication is through multi-hop forwarding over wireless links; 2) network nodes can arbitrarily move, which causes the network topology to change unpredictably; 3) self-configured and self-healing; 4) quick deployment; 5) bandwidth constrained; 6) energy constrained since most network nodes reply on battery.

Routing method is very important to wireless multi-hop networks. Node mobility causes the network topology and routes to keep changing. That frequently disrupts ongoing traffic flows and triggers more routing overhead. The network scalability is significantly impacted by increasingly triggered routing overhead as the network size extends. Therefore, the design philosophy of the routing method for wireless multi-hop networks is how to efficiently keep track of the varying network topology to maintain continuous connections and improve the network scalability, and effectively balances workloads and energy consumptions amongst network nodes to maximize the network lifetime.

The existing routing methods fall into two categories in terms of traffic forwarding: 1) source routing (e.g. DSR); 2) next-hop routing (e.g. AODV). In source routing, source nodes place a complete route path in each traffic packet, while each path node depends on the route path for forwarding the packet; in next-hop routing, each path node depends on its routing table to find the next hop for the destination in order to forward the packet. Due to the complete route path in each traffic packet, the routing overhead of source routing is greater than that of next-hop routing.

In terms of the route discovery strategy, the existing routing methods can be divided into three categories: 1) proactive routing (e.g. DSDV); 2) reactive routing (e.g. DSR, AODV); 3) hybrid routing (e.g. ZRP). In proactive routing, each node periodically exchanges routing information so that the latency of starting communication is short. However, the periodical routing information exchange causes great routing overhead. That is not meaningful if there is no need for traffic routing. More importantly, the periodical routing exchange cannot adapt to the varying network topology. In reactive routing, a source node initiates a route discovery by flooding a route request message throughout the network when the node wants to communicate with a destination node. Upon the destination node receives the route request message, the destination node unicast a route response message back to the source node. The source node depends on the route path to send traffic. When the source node finds the route path breaks, the source node re-initiates a flooding based route discovery as before. However, the flooding based route discovery greatly costs network resources and impacts other ongoing communication. In hybrid routing, the proactive routing strategy is used locally, while the reactive routing strategy is used in the whole network usually.

BRIEF SUMMARY OF THE INVENTION

An object of the present invention is to provide a routing method for nodes in a wireless multi-hop network to re-route traffic packets in order to solve the problem of node mobility and mitigate the problems of network scalability and constrained energy as described above. In one embodiment, a source node delivers traffic packets to a destination node through an old route path. Local broadcast of routing control messages is used for discovering a new route path, in which path nodes of the old route path and neighbors of the old route path are qualified for forwarding the routing control messages. Embodiments of the routing method can be based on next-hop routing and source routing and are named next-hop lock routing and source lock routing respectively.

The above and other preferred features, including various novel details of implementation and combination of elements, will be more particularly described with reference to the accompanying drawings and pointed out in the claims.

BRIEF DESCRIPTION OF THE DRAWINGS

FIG. 1 illustrates a diagram of a route update process in next-hop lock routing;

FIG. 2 illustrates a diagram of a traffic packet structure and a next-hop lock traffic header;

FIG. 3 illustrates a diagram of a route update message structure in next-hop lock routing;

FIG. 4 illustrates a flow diagram of an exemplary process for updating a routing table after receiving a route update message in next-hop lock routing;

FIG. 5 illustrates a diagram of a local route request message structure in next-hop lock routing;

DETAILED DESCRIPTION OF THE INVENTION

Figures 6, 7, 8:
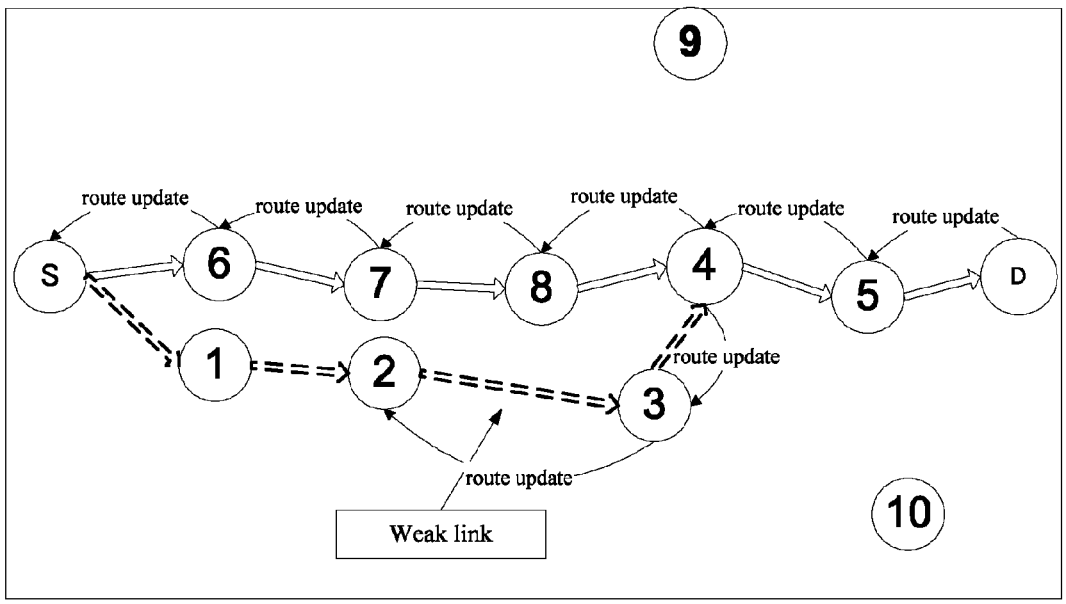
FIG. 6 illustrates a diagram of a route update process in source lock routing.
FIG. 7 illustrates a diagram of a traffic packet structure and a source lock traffic header.
FIG. 8 illustrates a diagram of a route update message structure in source lock routing.

Based on next-hop routing and source routing, the embodiments of the invention are categorized into next-hop lock routing and source lock routing respectively.

The following list describes acronyms and definitions for terms used herein:

path node: a network node that forwards traffic packets on a route path.

path neighbor: a network node around a route path that can overhear traffic packets on the route path. A path neighbor does not need to be aware that it is which path node's neighbor.

upstream node: a path node locates relatively close to the source node.

downstream node: a path node locates relatively close to the destination node.

route update node list: a set of nodes on a route path that participate in a route update process, which includes initiator, target, and intermediate path nodes.

link quality: parameters that can be signal strength, signal-to-noise ratio, bit error rate, or a combination of them.

node state parameter: parameters that measure the node state, e.g. remaining energy and workload.

valid neighbor timeout: a timer for a valid neighbor relationship.

routing control message identification: each node maintains an identification for each routing control message (e.g. route update, route reply, and route request) in order to determine freshness of the routing control message.

route update target: a final receiver of a route update message.

route update initiator: a node that initiates a route update process.

route update cache timer: a timer that caches a route update message.

route update idle timer: within the idle timer a route update initiator does not re-initiate a route update process for the same target node.

local route request message: a route request message from a source node to a destination node that is forwarded by qualified path nodes and path neighbors.

Embodiments of next-hop lock routing and source lock routing are described by way of examples with reference to the accompanying drawings.

1) An embodiment of next-hop lock routing is described as blow.

1.1) Route discovery: a source node floods a route request message to a destination node throughout a network. Upon receiving the route request message, the destination node unicast a route reply message back to the source node. Following the discovered route path, the source node sends traffic packets to the destination node. After receiving the first traffic packet, the destination node periodically broadcast hello packets.

1.2) Neighbor relationship: a node set up a neighbor relationship with a route path by overhearing traffic packets on the route path based on a route path identification (e.g. source and destination addresses, flow ID); a node set up a neighbor relationship with a source node or a path node by overhearing traffic packets sent by the source node or the path node; a node set up a neighbor relationship with a destination node by listening hello packets. The neighbor relationship expires after a valid neighbor timeout.

1.3) How a path node handles next-hop lock traffic header: FIG. 2 illustrates a diagram of a traffic packet structure and a next-hop lock traffic header. When a path node receives a traffic packet, the path node marks the route path for the traffic packet as active in its routing table, measures the link quality of the previous hop and its remaining energy, and updates the route update node list and the route update pending flag as needed. There can be three cases as below.

1.3.1) When the link quality of the previous hop falls below a threshold, or the remaining energy of the path node falls below a threshold, the path node inserts the IP addresses of the previous hop and the hop before the previous hop into the route update node list, and set the route update pending flag to be FALSE. FIG. 1 illustrates a route update process, in which Node 5 detects the link with Node 4 is turning stale, and inserts the IP addresses of Node 2 and Node 4 into the route update node list of the next-hop lock traffic header.

1.3.2) When the link quality of the previous hop does not fall below a threshold, the path node check three conditions as follows: a) the route update node list is not empty, b) the route update pending flag is FALSE, c) the path node has not cached a route update message to the same target node within the past route update cache timer. If the three conditions are all TRUE, the path node set the route update pending flag to be TRUE, and then generates and caches a route update message, in which the target is the most-upstream node in the route update node list. FIG. 3 illustrates a route update message structure. In FIG. 1, Node 8 generates and caches a route update message, in which the route update node list includes Node 2, 4, 5, and 8; the target is Node 2; the initiator is Node 8.

1.3.3) When the two conditions above are all FALSE, the path node cleans up the route update node list, and set the route update pending flag to be FALSE.

When a path node forwards a traffic packet, the path node replaces the IP address of the hop before the previous hop with the IP address of the previous hop, and set the IP address of the previous hop to be its IP address.

1.4) Route update process initiated by path node: if a path node caches a route update message, and detects the link quality of the next hop is greater than a threshold by overhearing traffic packets forwarded by the next path node or listening hello packets sent by the destination node, the path sends out the cached route update message. Otherwise, the path node discards the cached route update message.

1.5) Route update process initiated by destination node: if a destination node detects the link quality of the previous hop falls below a threshold, or finds the route update node list is not empty and the route update pending flag is FALSE, the destination node immediately sends out a route update message. In the route update message, the target is the most-upstream node in the route update node list; or is the node of the previous hop if the route update node list is empty.

1.6) Local broadcast of route update message: when a network node receives a route update message, the node drops the route update message in one of the following conditions: a) the link quality of the previous hop falls below a threshold; b) a state parameter of the node falls below a threshold, while the route update reason is due to the node state parameter; c) the route update message is initiated by the node; d) the route update message is duplicate; e) the node is not qualified for forwarding the route update message.

The qualification for forwarding the route update message is determined by one of the following conditions: a) the node is a path node on the route path that is to be updated; b) the node is a neighbor of one of the nodes in the route update node list.

If the node is qualified for forwarding the route update message, the node can update its routing table with the new route path. In FIG. 1, Node 6 participates in forwarding a route update message as a neighbor of Node 8, while a part of the old route path to the destination (Node 4→Node 5→Node 8) is replaced with that of the new route path (Node 4→Node 6→Node 8).

1.7) How a target node handles a route update message: FIG. 4 illustrates a flow diagram of an exemplary process for updating its routing table upon receiving a route update message.

1.8) Local broadcast of route rediscovery: when a source node receives a route error message from a path node, the source node sends a local route request message to the destination node. Path nodes of the previous route path and path neighbors of the previous route path are qualified for forwarding the local route request message. FIG. 5 is a diagram of a local route request message structure. Upon the destination node receives the local route request message, the node unicast a route reply message back to the source node. If local broadcast based route rediscovery cannot find a new route path, the source node floods a route request message to acquire a route path.

2) An embodiment of source lock routing is described as blow.

2.1) Route discovery: a source node floods a route request message to a destination node throughout a network. Upon receiving the route request message, the destination node unicast a route reply message back to the source node. Based on the discovered route path, the source sends traffic packets to the destination node.

2.2) Neighbor relationship: a node set up a neighbor relationship with a source node or a path node by overhearing traffic packets sent by the source node or the path node; a node set up a neighbor relationship with a destination node by listening route request messages. The neighbor relationship expires after a valid neighbor timeout.

2.3) Route update process determined by path node: when a path node detects the link quality of the previous hop falls below a threshold or one of its node state parameters (e.g. remaining energy, workload) falls below a threshold, the path node inserts a source lock traffic header illustrated in FIG. 7 into a traffic packet, and set the route update flag to be TRUE in order to request downstream nodes to initiate a route update process. In FIG. 6, Node 3 detects the link with Node 2 is turning stale and set the route update flag to be TRUE.

2.4) Route update process initiated by destination node: when a destination node finds a traffic packet contains a source lock traffic header, the route update flag is TRUE, and the node has not initiated a route update process to the source node within the past route update idle timer, the destination node sends a route update message to the source node. FIG. 8 illustrates a diagram of a route update message structure in source lock routing.

2.5) local broadcast of route update message: when a node receives a route update message, the node drops the route update message in one of the following conditions: a) the link quality of the previous hop falls below a threshold; b) a state parameter of the node falls below a threshold, while the route update reason is due to a node state parameter; c) the route update message is initiated by the node; d) the route update message is duplicate; e) the node is not qualified for forwarding the route update message.

The qualification for forwarding the route update message is determined by one of the following conditions: a) the node is a path node on the route path that is to be updated; b) the node is a path neighbor; c) the node is a neighbor of the target node.

If the node is qualified for forwarding the route update message, the node updates the parameters related to the new route path in the route update message, and forwards the route update message. FIG. 6 illustrates the route update process. Node 3 finds the link with Node 2 is turning stale, and then marks the route update flag in the traffic packets, which triggers the destination node to initiate a route update process to update the old route path (source→Node 1→Node 2→Node 3→Node 4→Node 5→destination). As a result, a new route path (source→Node 6→Node 7→Node 8→Node 4→Node 5→destination) is discovered after local broadcast of the route update message.

Figures 9, 10:
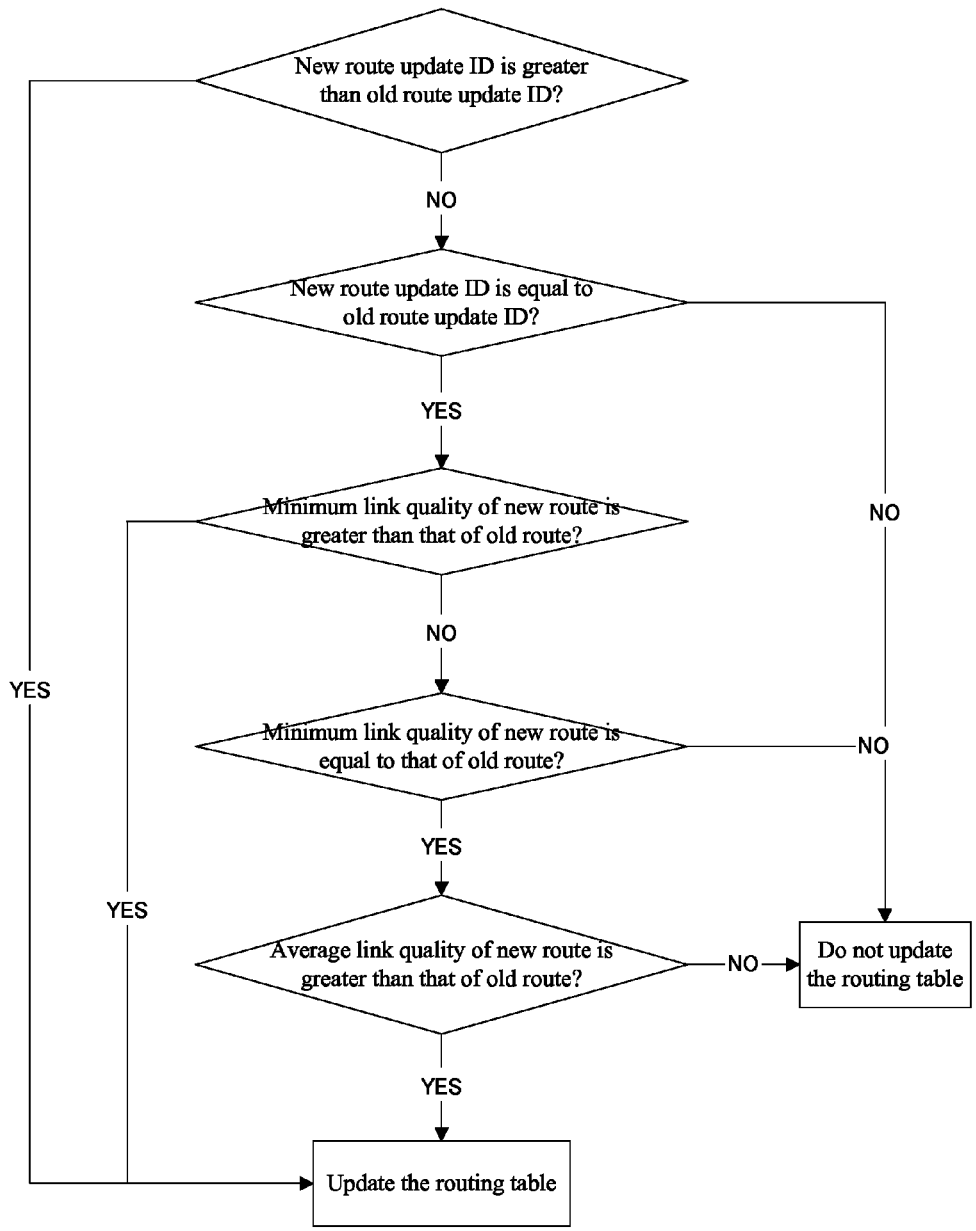
FIG. 9 illustrates a flow diagram of an exemplary process for updating a routing table after receiving a route update message in source lock routing.
FIG. 10 illustrates a diagram of a local route request message structure in source lock routing.

2.6) How a source node handles a route update message: FIG. 9 illustrates a flow diagram of an exemplary process for updating its routing table upon receiving a route update message.

2.7) Local broadcast of route rediscovery: when a source node receives a route error message from a path node, the source node sends a local route request message to the destination node. Path nodes of the previous route path and path neighbors of the previous route path are qualified for forwarding the local route request message. FIG. 10 is a diagram of a local route request message structure. Upon the destination node receives the local route request message, the node unicast a route reply message back to the source node. If local broadcast based route rediscovery cannot find a new route path, the source node floods a route request message to acquire a route path.

What is claimed is:

1. A method based on next-hop routing for nodes in a wireless multi-hop network, the network comprising a plurality of nodes that function as routers or hosts or both of them, the method comprising:
   delivering traffic packets from a source node to a destination node through a old route path;
   local broadcast of routing control messages is used to discover a new route path;
   the routing control messages include route update messages;
   a route update message contains an identification of the old route path, if the route update message is used to update the entire route path from the source node to the destination node;
   the destination node local broadcast a route update message to the source node;
   path nodes of the old route path, path neighbors of the old route path, and neighbors of the destination node are qualified for forwarding the route update message.

2. A method based on next-hop routing for nodes in a wireless multi-hop network, the network comprising a plurality of nodes that function as routers or hosts or both of them, the method comprising:
   delivering traffic packets from a source node to a destination node through a old route path;
   local broadcast of routing control messages is used to discover a new route path;
   the routing control messages include route update messages;
   a route update message contains a route update node list that indicates a part of the old route path to be updated, if the route update message is used to update a part of the old route path;
   when a downstream path node detects a part of the old route path needs update, and makes sure a route update process has no overlap with other simultaneous route update processes initiated by other nodes, the path node initiates the route update process, in which the target node of the route update message is the most-upstream node in the route update node list;
   the path nodes between the target node and the initiator and neighbors of the nodes in the route update node list are qualified for forwarding the route update message.

3. A method based on source routing for nodes in a wireless multi-hop network, the network comprising a plurality of nodes that function as routers or hosts or both of them, the method comprising:

delivering traffic packets from a source node to a destination node through a old route path;
local broadcast of routing control messages is used to discover a new route path;
the routing control messages include route update messages;
(a) a route update message is used to update the entire route path from the source node to the destination node, and contains an identification of the old route path: the destination node local broadcast a route update message to the source node; path nodes of the old route path, path neighbors of the old route path, and neighbors of the destination node are qualified for forwarding the route update message; or
(b) a route update message is used to update a part of the old route path, and contains a route update node list that indicates a part of the old route path to be updated;
(b1) when the destination node finds a part of the old route path needs update and decides to update the part of the old route path, the destination node local broadcast a route update message to the source node; path nodes of the old route path and neighbors of the nodes in the route update node list are qualified for forwarding the route update message;
(b2) when a path node finds a part of the old route path needs update and decides to update the part of the old route path, the path node local broadcast a route update message to the source node; upstream path nodes and neighbors of the nodes in the route update node list are qualified for forwarding the route update message.

4. A method according to claim 1 or 2, wherein whether to trigger a route update process depends on route update parameters that include the link quality and the path node state;
  a path node detects the link quality of the previous hop and its state during forwarding traffic packets, while the destination node detects the link quality of the last hop during receiving traffic packets;
  if a route update parameter exceeds a threshold, a route update process can be triggered;
  a path node checks the route update parameters to decide whether to trigger a route update process, or forwards the route update parameters to downstream nodes for the route update decision; the destination node checks the link quality of the last hop for the route update decision;
  within a period of time no more than one route update process from a initiator to a target node is launched.

5. A method according to claim 4, wherein the neighbor relationship with the destination node is set up by listening routing control messages sent by the destination node; the neighbor relationship with the source node and path nodes is set up by overhearing traffic packets; the neighbor relationship with the route path is set up by overhearing traffic packets on the route path; the neighbor relationship is restricted by a valid neighbor duration or the link quality;
  if a network node's state exceeds a threshold, the node discards received route update messages that are triggered due to the path node state;
  when a network node forwards a route update message, the network node updates the parameters related to the new route path in the route update message and its routing table;
  the target node of route update messages depends on the latest route update message to update its routing table; if multiple copies of the latest route update message arrive, the target node compares metrics of these new route paths to selectively update its routing table.

6. A method according to claim 1 or 2, wherein the routing control messages include local route request messages; a local route request process comprising:
  when a path node finds a broken link, the path node sends a route error message to the source node;
  upon receiving the route error message, the source node broadcast a local route request message to the destination node; path nodes of the old route path, path neighbors of the old route path, and neighbors of the destination node are qualified for forwarding the local route request message;
  the neighbor relationship with the old route path is set up by overhearing traffic packets on the route path, while the neighbor relationship with the destination node is set up by listening routing control messages by the destination node; the neighbor relationship is restricted by a valid neighbor duration;
  upon receiving the local route request message, the destination node sends a route reply message back to the source node.

7. A method according to claim 3, wherein whether to trigger a route update process depends on route update parameters that include the link quality and the path node state;
  a path node detects the link quality of the previous hop and its state during forwarding traffic packets, while the destination node detects the link quality of the last hop during receiving traffic packets;
  if a route update parameter exceeds a threshold, a route update process can be triggered;
  a path node checks the route update parameters to decide whether to trigger a route update process, or forwards the route update parameters to downstream nodes for the route update decision; the destination node checks the link quality of the last hop for the route update decision;
  within a period of time no more than one route update process from a initiator to a target node is launched.

8. A method according to claim 7, wherein the neighbor relationship with the destination node is set up by listening routing control messages sent by the destination node; the neighbor relationship with the source node and path nodes is set up by overhearing traffic packets; the neighbor relationship with the route path is set up by overhearing traffic packets on the route path; the neighbor relationship is restricted by a valid neighbor duration or the link quality;
  if a network node's state exceeds a threshold, the node discards received route update messages that are triggered due to the path node state;
  when a network node forwards a route update message, the network node updates the parameters related to the new route path in the route update message;
  the source node depends on the latest route update message to update its routing table; if multiple copies of the latest route update message arrive, the source node compares metrics of these new route paths to selectively update its routing table.

9. A method according to claim 3, wherein the routing control messages include local route request messages; a local route request process comprising:
  when a path node finds a broken link, the path node sends a route error message to the source node;
  upon receiving the route error, the source node broadcast a local route request message to the destination node; path nodes of the old route path, path neighbors of the old route path, and neighbors of the destination node are qualified for forwarding the local route request message;

the neighbor relationship with the old route path is set up by overhearing traffic packets on the route path, while the neighbor relationship with the destination node is set up by listening routing control messages by the destination node; the neighbor relationship is restricted by a valid neighbor duration;

upon receiving the local route request message, the destination node sends a route reply message back to the source node.

10. A method according to claim 1 or 2 or 3, wherein the source node sends dummy packets to the destination node if a time gap between two traffic packets in a traffic flow exceeds a threshold.

* * * * *